Sept. 22, 1936.　　　　W. I. JONES　　　　2,055,443

NUT MEMBER

Filed Dec. 13, 1934

Inventor:
Walter I. Jones

Patented Sept. 22, 1936

2,055,443

UNITED STATES PATENT OFFICE 2,055,443

NUT MEMBER

Walter I. Jones, Arlington, Mass., assignor to United-Carr Fastener Corporation, Cambridge, Mass., a corporation of Massachusetts Application December 13, 1934, Serial No. 757,340

2 Claims. (Cl. 85—32)

My invention aims to provide improvements in nuts and installations thereof, particularly that type of nut which is adapted to be countersunk in the material of the assembly in which it is to be used.

In the drawing, which illustrates a preferred form of my invention:—

One object of my invention is to provide a metal nut preferably formed from a single piece of sheet metal.

Another object of my invention is to provide a nut which may be easily used in blind assemblies where it is difficult or impossible to hold the nut against turning during engagement with the bolt.

The particular form of nut which I have used to illustrate my invention comprises an internally threaded barrel part 1, a flange 2 at one end of the barrel, and a number of attaching prongs 3 preferably located at the opposite end of the barrel. The entire nut is made from one piece of sheet metal for purposes of strength and simplicity.

The flange 2 may be of any shape and is formed perpendicular to the axis of the barrel 1, so that it will act as a centering guide during the installation of the nut, as will be more fully explained hereinafter. The prongs 3 are formed from the material of the barrel and have sharpened ends. The prongs are bent back towards the flange 2, in order to provide a smooth entering portion at that end of the barrel and are preferably at an angle of less than ninety degrees relative to the axis of the barrel 1.

Figure 1:
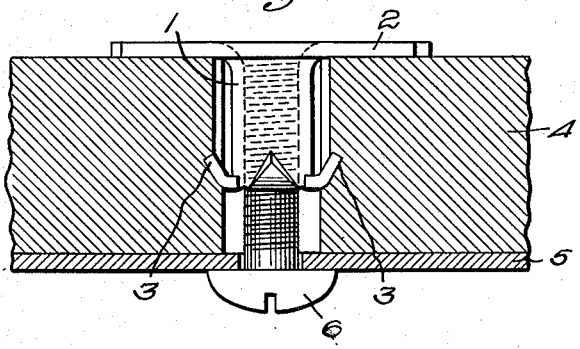
Figure 1 is a section through an assembly including a form of my invention.
Figure 2:
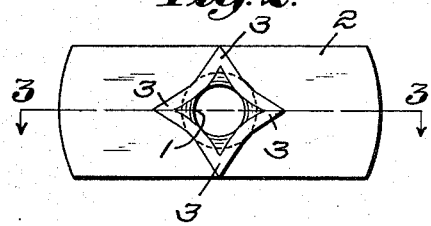
Fig. 2 is an end view of the nut itself.
Figure 3:
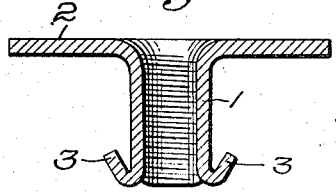
Fig. 3 is a section taken on the line 3—3 of Fig. 2.

I shall now proceed with a description of one way in which my invention may be used. The particular installation which I have shown (Fig. 1) comprises a wooden member 4, a part 5 to be secured thereto, a bolt 6, and a form of my improved nut. A hole is drilled in the wooden member 4 of slightly larger diameter than the barrel 1, but not as large as the distance between the ends of the prongs 3. The hole in the part 5 is drilled to take the shank of the bolt 6. The nut is then driven or otherwise forced into the hole in the part 4 until the flange 2 lies flat against the surface thereof. Since the flange is perpendicular to the barrel, the threads on the inside will now be in line with the path of the bolt. During the insertion of the nut, the prongs 3 will score the sides of the hole slightly, and will be firmly engaged therewith, as shown in Fig. 1. During the movement of the attaching prongs 3 along the wall of the hole in the support 4 they, and the fibers of the wood, are compressed slightly so that when the prongs reach their final position the wood fibers tend to return and the prongs tend to "dig into" the wood especially at their ends. Thus the prongs prevent the nut from loosening and also prevent turning. The nut is therefore securely and very rigidly held in position so that it need not be held when a screw is being engaged therewith from either side. And furthermore, parts may be held against the flanged side of the nut, so great is the holding power of the prongs 3.

As stated above, this nut installation is of great importance in blind assemblies, and in other places where the nut is inaccessible from that side of the assembly at which the bolt is being inserted.

While I have illustrated and described a preferred form of my invention I do not wish to be limited to such description, since the scope of my invention is best defined by the following claims.

I claim: -

1. A sheet metal nut formed from a single piece of material and having an internally threaded portion for the purpose of receiving a bolt and the like, a flange at one end of said threaded portion, and a plurality of triangular-shaped sharpened prongs extending from another part of said threaded portion, each of said prongs having its base portion integral with said threaded portion and its vertex extending towards said flange and spaced from said threaded portion.

2. A sheet metal nut and the like having an internally threaded cylindrical portion for the purpose of receiving a bolt and the like, a flange extending outwardly from one end of said cylinder in a plane substantially perpendicular to the longitudinal axis thereof, and a plurality of triangular-shaped prongs extending from the opposite end of said cylinder, each of said prongs having a sharpened vertex extending towards said flange and in spaced relationship to the outer surface of said cylinder.

WALTER I. JONES.